United States Patent
Armangau et al.

(10) Patent No.: US 11,403,175 B2
(45) Date of Patent: Aug. 2, 2022

(54) REBUILDING DATA PREVIOUSLY STORED ON A FAILED DATA STORAGE DRIVE

(71) Applicant: EMC IP Holding Company LLC, Hopkinton, MA (US)

(72) Inventors: Philippe Armangau, Acton, MA (US); Geng Han, Beijing (CN); Jian Gao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 210 days.

(21) Appl. No.: 16/944,395

(22) Filed: Jul. 31, 2020

(65) Prior Publication Data
US 2022/0035708 A1 Feb. 3, 2022

(51) Int. Cl.
*G06F 11/10* (2006.01)
*G06F 3/06* (2006.01)

(52) U.S. Cl.
CPC .......... *G06F 11/1092* (2013.01); *G06F 3/061* (2013.01); *G06F 3/064* (2013.01); *G06F 3/0607* (2013.01); *G06F 3/0646* (2013.01); *G06F 3/0689* (2013.01)

(58) Field of Classification Search
CPC .... G06F 11/1092; G06F 3/0607; G06F 3/061; G06F 3/064; G06F 3/0646; G06F 3/0689
See application file for complete search history.

(56) References Cited

U.S. PATENT DOCUMENTS

| | | | | |
|---|---|---|---|---|
| 7,099,273 | B2* | 8/2006 | Ha | H04L 47/283 370/235 |
| 7,979,635 | B2* | 7/2011 | Bates | G06F 11/1084 711/114 |
| 8,751,861 | B2* | 6/2014 | Nair | G06F 3/0611 714/6.21 |
| 8,792,150 | B2* | 7/2014 | Moriyama | H04N 1/603 358/1.9 |
| 9,961,345 | B2* | 5/2018 | Rossato | H04N 19/59 |
| 10,095,585 | B1 | 10/2018 | Proulx | |
| 10,180,880 | B2* | 1/2019 | Khadiwala | G06F 11/3034 |
| 10,496,483 | B2 | 12/2019 | Xiao et al. | |
| 10,681,134 | B2* | 6/2020 | Khadiwala | G06F 3/065 |
| 11,194,709 | B2* | 12/2021 | Winterfeld | G06F 11/3058 |
| 2009/0235022 | A1* | 9/2009 | Bates | G06F 11/1084 711/E12.001 |
| 2013/0205166 | A1* | 8/2013 | Nair | G06F 3/0659 714/E11.122 |

* cited by examiner

*Primary Examiner* — Matthew M Kim
*Assistant Examiner* — Matthew N Putaraksa
(74) *Attorney, Agent, or Firm* — BainwoodHuang

(57) ABSTRACT

In response to detecting the failure of a data storage drive, a drive rebuild operation is performed. The drive rebuild operation is performed by periodically i) calculating a target rebuild rate that enables data previously stored on the failed data storage drive to be completely rebuilt on at least one other data storage drive within an expected drive rebuild time window, ii) calculating a new value for at least one drive rebuild parameter based on a value for the drive rebuild parameter corresponding to the target rebuild rate indicated by a static rebuild rate data structure and a current level of host I/O (Input/Output) activity, and iii) rebuilding the data previously stored on the failed data storage drive on the at least one other data storage drive for a predetermined time period with the at least one drive rebuild parameter set to the new value for the drive rebuild parameter.

19 Claims, 10 Drawing Sheets

REBUILD RATE TABLE 600
(STATIC REBUILD RATE DATA STRUCTURE)

| PHYS. BLOCKS \ PROC. CORES | 1 | 2 | 3 | 4 | 5 | 6 | 7 | ... | MAX_N |
|---|---|---|---|---|---|---|---|---|---|
| 1 | V(1,1) | | | | | | | | |
| 2 | | | | | | | | | |
| 3 | | | | | | | | | |
| ... | | | | | | | | | |
| MAX_M | | | | | | | | | V(MAX_N, MAX_M) |

INCREASING VALUES (REBUILD RATES)

Fig. 6

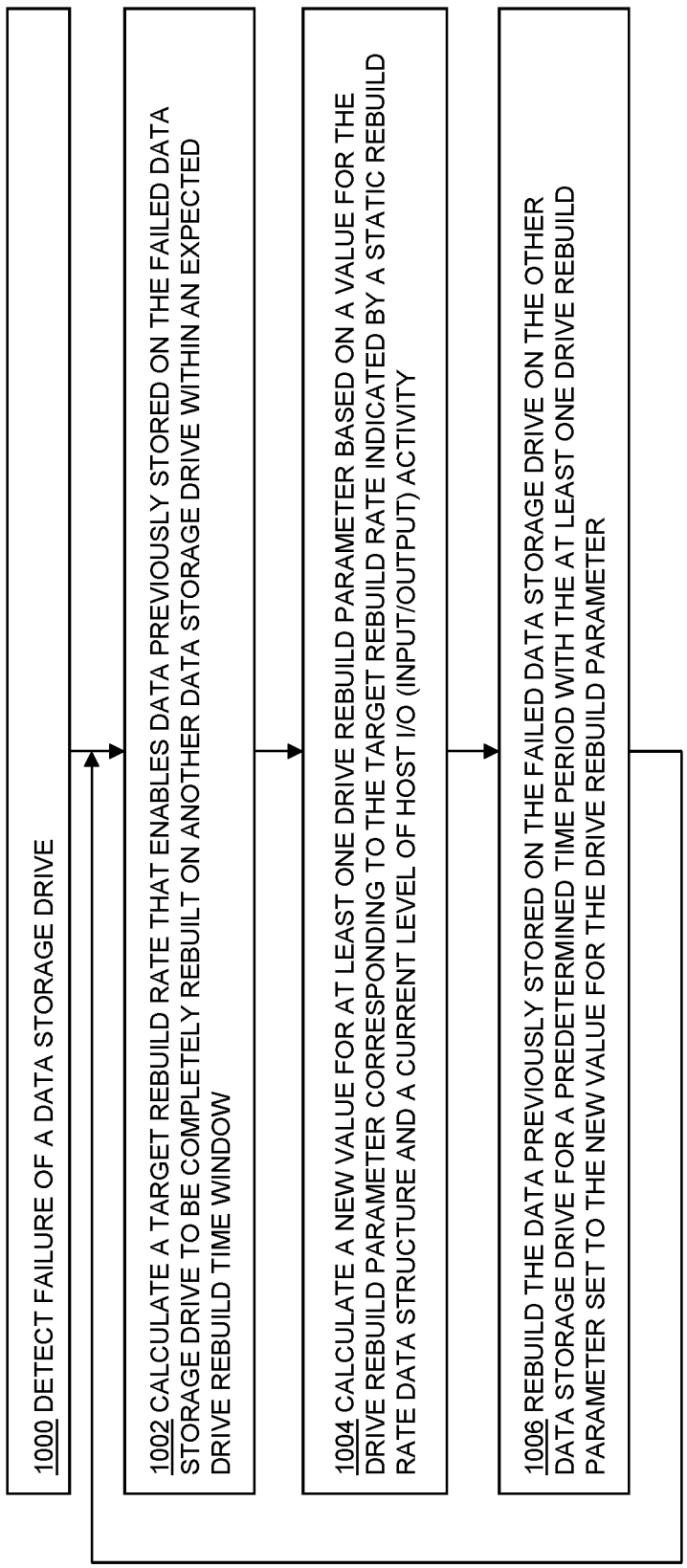

REBUILDING DATA PREVIOUSLY STORED ON A FAILED DATA STORAGE DRIVE

TECHNICAL FIELD

The present disclosure relates generally to data storage systems that rebuild data previously stored on a failed data storage drive using RAID (Redundant Array of Independent Disks) data protection, and more specifically to technology for rebuilding data previously stored on a failed data storage drive with minimum performance impact on host I/O requests processed during the rebuilding.

BACKGROUND

Data storage systems are arrangements of hardware and software that may include one or more storage processors coupled to non-volatile data storage drives, such as solid state drives and/or magnetic disk drives. Each storage processor may service host I/O requests received from physical and/or virtual host machines ("hosts"). The host I/O requests received by the storage processor may specify one or more storage objects (e.g. logical units ("LUNs"), and/or files, etc.) that are hosted by the storage system and store user data that is written and/or read by the hosts. Each storage processor executes software that processes host I/O requests and performs various data processing tasks to organize and secure the user data in the non-volatile data storage drives of the data storage system.

Some data storage systems include RAID (Redundant Array of Independent Disks) data protection technology. RAID technology enables data previously stored on a failed data storage drive to be rebuilt on one or more other data storage drives. For example, some RAID technology performs data striping, in which logically consecutive data blocks are stored across multiple different data storage drives in "stripes", together with corresponding per-stripe parity information. When a data storage drive fails, the data stored on the surviving data storage drives may be used together with the parity information to rebuild the data that was previously stored on the failed data storage drive on a replacement data storage drive. In mapped RAID technology, each physical data storage drive is divided into multiple contiguous regions of physical non-volatile data storage referred to as "drive extents". Individual sets of drive extents, in which each drive extent is located on a different data storage drive, are then used to store stripes containing blocks of data and parity information in the manner that data and parity information are striped across disks in groups of disks in traditional RAID systems.

SUMMARY

The longer the amount of time required to rebuild RAID protected data previously stored on a failed data storage, the lower the reliability of a data storage system. For example, in the time period during which data previously stored on a failed data storage drive is being rebuilt (the "drive rebuild time window"), the data storage system may operate with an increased risk of data loss. In the case where the data storage system provides guaranteed data protection up to some number of concurrent data storage drive failures, the level of data protection provided by the data storage system may effectively be lessened while the drive rebuild is being performed. Accordingly, in order to provide a desired level of reliability (e.g. what is sometimes referred to as "five nines" reliability, and/or some other specific level of reliability), the time period during which data previously stored on the failed data storage drive is rebuilt on one or more other data storage drives should be kept short.

In addition, it is desirable for data storage systems to continue processing host I/O requests during the drive rebuild time window. As the amount of system resources (e.g. processing resources) consumed to rebuild the data previously stored on the failed data storage drive increases, performance with regard to processing host I/O requests during the drive rebuild time window may be negatively impacted. The amount of system resources that are consumed to rebuild data previously stored on a failed data storage drive should accordingly be limited, in order to limit the performance impact on concurrent processing of host I/O requests during the drive rebuild time window.

To address the above described and other shortcomings of previous technologies, new technology is disclosed herein that, in response to detecting failure of a data storage drive, performs a drive rebuild operation by periodically performing steps including calculating a target rebuild rate that enables data previously stored on the failed data storage drive to be completely rebuilt on at least one other data storage drive within an expected drive rebuild time window, calculating a new value for at least one drive rebuild parameter based on a value for the drive rebuild parameter corresponding to the target rebuild rate indicated by a static rebuild rate data structure and a current level of host I/O (Input/Output) activity, and rebuilding the data previously stored on the failed data storage drive on the other data storage drive for a predetermined time period with the at least one drive rebuild parameter set to the new value for the drive rebuild parameter.

In some embodiments, rebuilding the data previously stored on the failed data storage drive on the other data storage drive during the predetermined time period includes executing multiple rebuild jobs in parallel during the predetermined time period, and the at least one drive rebuild parameter includes a total number of processor cores on which corresponding individual drive rebuild jobs are scheduled for execution in parallel during the predetermined time period.

In some embodiments, the disclosed technology determines the current level of host I/O activity at least in part by detecting a number of processor cores that are not currently performing host I/O processing. Calculating the new value for the total number of processor cores on which corresponding individual drive rebuild jobs are scheduled for execution in parallel during the predetermined time period may include comparing the number of processor cores not currently performing host I/O processing to the value for the total number of processor cores on which corresponding individual drive rebuild jobs are scheduled for execution in parallel indicated by the static rebuild rate data structure, and, in response to the number of processor cores not currently performing host I/O processing exceeding the total number of processor cores on which corresponding individual drive rebuild jobs are scheduled for execution in parallel indicated by the static rebuild rate data structure, setting (i.e. increasing) the total number of processor cores on which corresponding individual drive rebuild jobs are scheduled for execution in parallel to the number of processor cores not currently performing host I/O processing.

In some embodiments, rebuilding the data previously stored on the failed data storage drive further may include rebuilding data previously stored in multiple physical blocks in parallel, and the at least one drive rebuild parameter may further include a total number of physical blocks for which data is rebuilt in parallel by each one of the rebuild jobs during the predetermined time period.

In some embodiments, the static rebuild rate data structure may be a table of data elements storing multiple rebuild rates. In such embodiments, the disclosed technology may determine a data element in the table that stores a value equal to the target rebuild rate, and then determine the value for the at least one drive rebuild parameter corresponding to the target rebuild rate indicated by the static rebuild rate data structure as at least one index of the data element that stores a value equal to the target rebuild rate.

In some embodiments, the data previously stored on the failed data storage drive may have been protected using mapped RAID (Redundant Array of Independent Disks) data protection provided in a plurality of RAID extents. In such embodiments, each one of the drive rebuild jobs may rebuild data previously stored using a single one of the RAID extents.

In some embodiments, the disclosed technology may calculate the target rebuild rate that enables the data previously stored on the failed data storage drive to be completely rebuilt on the other data storage drive within the expected rebuild time window based at least in part on a percentage of the data previously stored on the failed data storage drive that has been rebuilt on the other data storage drive and an amount of time that has elapsed since the drive rebuild operation began.

In some embodiments, each of the individual drive rebuild jobs may be executed on a corresponding one of the processor cores at a higher execution priority than the host I/O processing.

In some embodiments, drive rebuild jobs may be assigned to corresponding processor cores within a set of processor cores according to a first ordering of the processor cores within the set of processor cores. In such embodiments, host I/O processing may be assigned to processor cores within the set of processor cores according to a second ordering of the processor cores within the set of processor cores, where the second ordering of the processor cores within the set of processor cores is a reverse order with respect to the first ordering of the processor cores within the set of processor cores.

Embodiments of the disclosed technology may provide significant advantages over previous technical solutions. For example, the disclosed technology enables a data storage system to provide a high level of reliability, by ensuring that the time period after the failure of a data storage drive, during which data previously stored on the failed data storage drive is rebuilt on one or more other data storage drives that are still functional, is kept small. In another example of an advantage, the disclosed technology enables a data storage system to maintain a high level of performance with regard to host I/O request processing during the drive rebuild time window.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

FIG. 6 is a block diagram showing an example of a static rebuild rate data structure in some embodiments;

FIG. 10 is a flow chart showing steps performed in some embodiments to perform a data storage drive rebuild operation.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

Embodiments of the technology disclosed herein may provide improvements over previous technologies by reducing the time period during which data previously stored on a failed data storage drive is rebuilt on one or more other data storage drives, while also providing high performance with regard to host I/O processing that may be performed during the drive rebuild time window.

During operation of embodiments of the technology disclosed herein, in response to detecting failure of a data storage drive, a drive rebuild operation is performed by periodically i) calculating a target rebuild rate that enables data previously stored on the failed data storage drive to be completely rebuilt on at least one other data storage drive within an expected drive rebuild time window, ii) calculating a new value for at least one drive rebuild parameter based on a value for the drive rebuild parameter corresponding to the target rebuild rate indicated by a static rebuild rate data structure and a current level of host I/O (Input/Output) activity, and iii) rebuilding the data previously stored on the failed data storage drive on the at least one other data storage drive for a predetermined time period with the at least one drive rebuild parameter set to the new value for the drive rebuild parameter.

Figure 1:
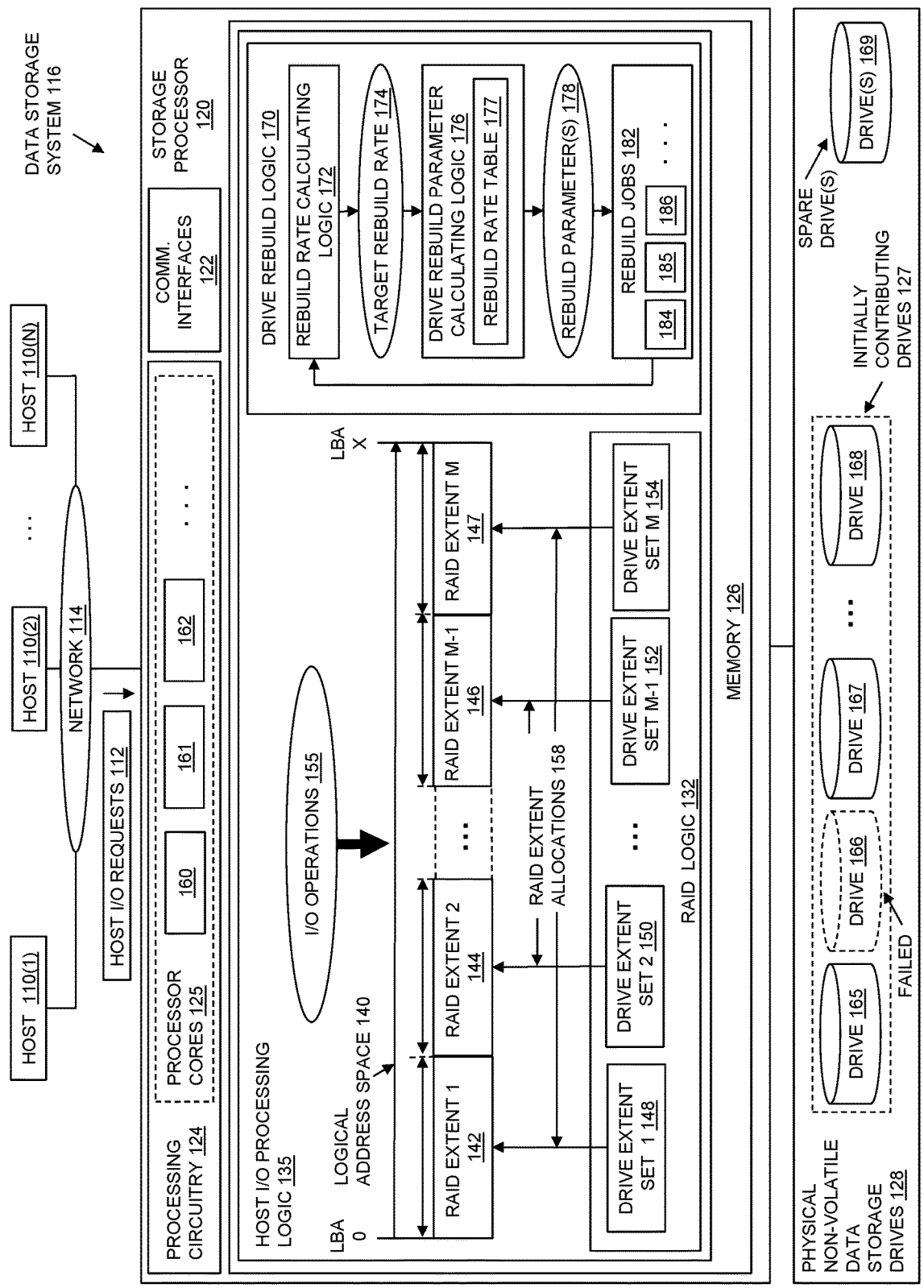
FIG. 1 is a block diagram showing an example of a data storage system in which an example of the disclosed technology is embodied.

FIG. 1 is a block diagram showing an operational environment for the disclosed technology, including an example of a data storage system in which the disclosed technology is embodied. FIG. 1 shows some number of physical and/or virtual Host Computing Devices 110, referred to as "hosts" and shown for purposes of illustration by Hosts 110(1) through 110(N). The hosts and/or applications may access data storage provided by Data Storage System 116, for example over one or more networks, such as a local area network (LAN), and/or a wide area network (WAN) such as the Internet, etc., and shown for purposes of illustration in FIG. 1 by Network 114. Alternatively, or in addition, one or more of Hosts 110(1) and/or applications accessing data storage provided by Data Storage System 116 may execute within Data Storage System 116. Data Storage System 116 includes at least one Storage Processor 120 that is communicably coupled to Network 114 and Physical Non-Volatile Data Storage Drives 128, e.g. though one or more Communication Interfaces 122. No particular hardware configuration is required, and Storage Processor 120 may be embodied as any specific type of device that is capable of processing host input/output (I/O) requests received from Hosts 110 (e.g. I/O read and I/O write requests, etc.) and persistently storing data.

The Physical Non-Volatile Data Storage Drives 128 may include physical data storage drives such as solid state drives, magnetic disk drives, hybrid drives, optical drives, and/or other specific types of drives. Physical Non-Volatile Data Storage Drives 128 may be directly physically connected to and/or contained within Storage Processor 120, and/or may be indirectly connected to Storage Processor 120, e.g. by way of one or more networks.

A Memory 126 in Storage Processor 120 stores program code that is executable on Processing Circuitry 124, as well as data generated and/or processed by such program code. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. As shown in FIG. 1, Processing Circuitry 124 includes multiple Processor Cores 125, each one of which is independently capable of reading and executing program code instructions that may be organized as jobs, tasks, processes, threads, etc. For purposes of illustration, the Processor Cores 125 in Processing Circuitry 124 are shown in FIG. 1 by processor cores 160, 161, 162, and so on.

Processing Circuitry 124 and Memory 126 together form control circuitry, which is configured and arranged to carry out various methods and functions as described herein. The Memory 126 stores a variety of software components that may be provided in the form of executable program code. For example, Memory 126 may include software components such as Host I/O Processing Logic 135. When program code in Memory 126 is executed by Processing Circuitry 124, Processing Circuitry 124 is caused to carry out the operations of the software components. Although certain software components are shown in the Figures and described herein for purposes of illustration and explanation, those skilled in the art will recognize that Memory 126 may include various other software components, such as operating system components, various applications, hosts, other specific processes, etc.

During operation, in order to provide mapped RAID data protection for data stored by write operations in I/O Operations 155, RAID Logic 132 divides each of the physical non-volatile data storage drives in Physical Non-Volatile Data Storage Drives 128 into multiple, equal size drive extents. Each drive extent consists of physically contiguous non-volatile data storage located on a single data storage drive. For example, in some configurations, RAID Logic 132 may divide each one of the physical non-volatile data storage drives in Physical Non-Volatile Data Storage Drives 128 into the same fixed number of equal size drive extents of physically contiguous non-volatile storage. The size of the individual drive extents into which the physical non-volatile data storage drives in Physical Non-Volatile Data Storage Drives 128 are divided may, for example, be the same for every physical non-volatile data storage drive in Physical Non-Volatile Data Storage Drives 128. Various specific sizes of drive extents may be used in different embodiments. For example, in some embodiments each drive extent may have a size of 10 gigabytes. Larger or smaller drive extent sizes may be used in the alternative for specific embodiments and/or configurations. Any specific number of physical non-volatile data storage drives may be contained in the Physical Non-Volatile Data Storage Drives 128 and divided into equal size drive extents by RAID Logic 132.

RAID Logic 132 organizes some or all of the drive extents created in Physical Non-Volatile Data Storage Drives 128 into discrete sets of multiple drive extents, shown for purposes of illustration by Drive Extent Set 1 148, Drive Extent Set 2 150, and so on through Drive Extent Set M−1 152 and Drive Extent Set M 154. Each drive extent may be contained within only one set of drive extents. Within each one of the sets of drive extents, each drive extent is located on a different physical non-volatile data storage drive, in order to ensure correct RAID operation.

As shown in FIG. 1 by RAID Extent Allocations 158, each one of the sets of drive extents is assigned and mapped (e.g. using mapping data structures in RAID Logic 132 and/or Host I/O Processing Logic 135, such as one or more mapping tables or other mapping data structures) to a single corresponding logical RAID extent, and is used to store data indicated by write operations in I/O Operations 155 that are directed to logical block addresses contained in a sub-range of logical block addresses within Logical Address Space 140 that is mapped to that RAID extent. In the example of FIG. 1, while processing Host I/O Requests 112, Host I/O Processing Logic 135 may issue write operations to logical block addresses within Logical Address Space 140 to persistently store host data indicated by write requests in Host I/O Requests 112, and/or metadata generated during the processing of Host I/O Requests 112. For example, at least one logical unit ("LUN") of non-volatile data storage in Physical Non-Volatile Data Storage Drives 128 may be accessed by Host I/O Processing Logic 135 through Logical Address Space 140.

The capacity of each RAID extent may be equal to the size of the sub-range of logical block addresses within Logical Address Space 140 that is mapped to that RAID extent. For example, in some embodiments or configurations, each RAID extent may have the same capacity. For example, the capacity of each RAID extent may be 64 gigabytes, or some other specific storage capacity.

In the example of FIG. 1, Drive Extent Set 1 148 is assigned and mapped to RAID Extent 1 142, Drive Extent Set 2 150 is assigned and mapped to RAID Extent 2 144, and so on, through Drive Extent Set M-1 152, which is assigned and mapped to RAID Extent M-1 146, and Drive Extent Set M 154, which is assigned and mapped to RAID Extent M 147. Further in the example of FIG. 1, Logical Address Space 140 extends from a lowest logical address LBA 0 through a highest logical address LBA X. In some embodiments, each logical block address in Logical Address Space 140 may indicate a 4 kilobyte (4KB) page of non-volatile data storage.

For each RAID extent, Host I/O Processing Logic 135 uses some number of physical blocks of non-volatile data storage to store the data written to the logical block addresses contained within the sub-range of Logical Address Space 140 corresponding to that RAID extent. The physical blocks of non-volatile storage used to store data written to the logical block addresses corresponding to a given RAID extent are located in (e.g. striped across) the set of drive extents that are assigned and mapped to that RAID extent. Accordingly, the physical blocks used to store data written to the sub-range of logical block addresses corresponding to RAID Extent 1 142 are located in the drive extents in Drive Extent Set 1 148, the physical blocks used to store data written to the sub-range of logical block addresses corresponding to RAID Extent 2 144 are located in the drive extents of Drive Extent Set 2 150, and so on, with the physical blocks that are used to store data written to the sub-range of logical block addresses corresponding to RAID Extent M-1 146 being located in the drive extents of Drive Extent Set M-1 152, and the physical blocks used to store data written to the sub-range of logical block addresses corresponding to RAID Extent M 147 being located in the drive extents of Drive Extent Set M 154.

Each physical block of non-volatile data storage used to store the data written to the sub-range of logical block addresses corresponding to a RAID extent is considered to be "contained" by that RAID extent, and may contain multiple physical pages of non-volatile storage that are each mapped (e.g. by a hierarchical mapping tree data structure or the like in RAID Logic 132 and/or Host I/O Processing Logic 135) to corresponding logical block addresses within the sub-range of logical block addresses corresponding to that RAID extent. For example, in some embodiments or configurations, each physical block may include or consist of a physically contiguous chunk of non-volatile data storage that may be used to store user data and/or metadata, per a specific type of RAID protection provided by the RAID extent that uses the physical block. In this way, each RAID extent may be considered to contain multiple physical blocks of non-volatile data storage that are "in" that RAID extent. In some embodiments or configurations, each physical block may consist of a 2 megabytes (MBs) of non-volatile data storage that is striped across the drive extents allocated to the RAID extent that contains that physical block. When a data storage drive fails, the disclosed technology uses RAID data rebuilding techniques based on data and parity stored in the RAID extents located on surviving data storage drives to rebuild the data previously stored in the data blocks contained in each RAID extent that has a set of drive extents that includes a drive extent located on the failed data storage drive. Thus failure of a single data storage drive causes the disclosed technology to rebuild data stored in physical blocks that are contained in multiple individual RAID extents. To rebuild data stored in each individual RAID extent, the disclosed technology rebuilds the data stored in each one of the physical blocks contained in that RAID extent using data and parity information stored in those drive extents that are i) contained within the set of drive extents that are assigned and mapped to that RAID extent, and ii) located on non-failed data storage drives.

RAID Logic 132 provides RAID protection separately and independently for each individual RAID extent. The data written to the logical addresses within the sub-range of logical block addresses mapped to a specific RAID extent may accordingly be stored by RAID Logic 132 based on a specific level of RAID protection corresponding to that RAID extent. For example, RAID Logic 132 may use data striping ("striping") to distribute data indicated by write operations in I/O Operations 155 directed to logical block addresses within the sub-range of logical block addresses mapped to a given RAID extent together with parity information across the drive extents in the set of drive extents that are assigned and mapped to that RAID extent, based on the RAID level corresponding to that RAID extent. For example, RAID Logic 132 may perform data striping by storing logically sequential blocks of data (sometimes referred to as logically sequential "segments" or "chunks" of data) and associated parity information on different drive extents within the drive extent set that is assigned and mapped to the specific one of the RAID extents that is mapped to the sub-range of logical block addresses within Logical Address Space 140 that contains the logical block addresses to which the write operations that indicate the logically sequential blocks of data are directed.

Each series of logically sequential blocks of data and associated parity information that is stored across the drive extents in a set of drive extents may be referred to as a RAID "stripe". RAID Logic 132 may employ parity based data protection to provide fault tolerance, such that one or more additional parity blocks are maintained in each stripe. For example, a parity block may be maintained for each stripe that is the result of performing a bitwise exclusive "OR" (XOR) operation across the logically sequential blocks of data contained in the stripe. Such parity information may be distributed across the drive extents within a drive extent set, so that parity information is not always stored on the same drive extent. Accordingly, when the data storage for a data block in the stripe fails, e.g. due to a failure of the drive containing the drive extent that stores the data block, the lost data block may be recovered by RAID Logic 132 performing an XOR operation across the remaining data blocks and a parity block stored within drive extents located on non-failing data storage drives.

Various specific RAID levels having block level data striping with distributed parity may be provided by RAID Logic 132 for individual RAID extents, i.e. for the data written to sub-ranges of logical addresses that are mapped to individual RAID extents. For example, RAID Logic 132 may provide block level striping with distributed parity error protection in 4 D+1 P ("four data plus one parity") RAID-5 for one or more RAID extents. In 4 D+1 P RAID-5, each stripe consists of 4 data blocks and a block of parity information. When 4 D+1 P RAID-5 is used for a RAID extent, at least five drive extents must be contained in the drive extent set assigned and mapped to the RAID extent, so that each one of the four data blocks and the parity information for each stripe can be stored on a different drive extent, and therefore stored on a different storage drive. In the event that a storage drives fails containing one of the drive extents in a drive extent set assigned and mapped to a RAID extent, the data stored in the physical blocks contained in that RAID extent are rebuilt by the disclosed technology using a drive extent located on a functioning data storage drive by performing XOR operations on the data and parity stored on the remaining drive extents in the drive extent set on a per-stripe basis. 4 D+1 P RAID-5 is generally considered to be effective in preventing data loss in the case of single drive failures, but data may be lost when two or more drives fail concurrently.

RAID Logic 132 may provide various other RAID levels to one or more of the RAID extents, in order to provide a higher level of data protection, e.g. data protection even in the event that multiple disks fail concurrently. For example, RAID Logic 132 may use 4 D+2 P RAID-6 to provide striping with double distributed parity information that is provided on a per-stripe basis. The double parity information maintained by 4 D+2 P RAID-6 enables data protection for up to a maximum of two concurrently failing drives.

In the example of FIG. 1, the drive extents in the sets of drive extents assigned and mapped to the RAID extents allocated to Logical Address Space 140 may initially be located on the Initially Contributing Drives 127. One or more spare drives may also be included in Physical Non-Volatile Data Storage Drives 128 to operate as "hot spares". For example, Drive(s) 169 may be provided as one or more spare drives (e.g. one or more hot spares).

In response to detecting that a data storage drive in Physical Non-Volatile Data Storage Drives 128 has failed, Drive Rebuild Logic 170 operates to rebuild data previously stored by I/O Operations 155 on that data storage drive onto one or more other data storage drives. Since drive extents located on the failed data storage drive may be contained in drive extent sets that are assigned and mapped to multiple RAID extents, Drive Rebuild Logic 170 may rebuild data previously stored in multiple RAID extents. In the example of FIG. 1, Drive Rebuild Logic 170 detects that Drive 166 has failed, and that drive extents from Drive 166 are contained in multiple drive extent sets, e.g. including at least Drive Extent Set 1 148 and Drive Extent Set 2 150. The data previously stored in the physical blocks contained in the set of multiple RAID extents including RAID Extent 1 142 and RAID Extent 2 150 and other RAID extents is then rebuilt by the disclosed technology using other drive extents to replace the drive extents located on the failed data storage drive, e.g. drive extents contained in Drive(s) 169. Alternatively, data previously stored in physical blocks contained in the set of multiple RAID extents including RAID Extent 1 142 and RAID Extent 2 150 and other RAID extents may be rebuilt using drive extents contained in one or more surviving non-volatile data storage drives in Initially Contributing Drives 127.

For example, in the example of FIG. 1, upon detecting that Drive 166 has failed, Drive Rebuild Logic 170 may perform a drive rebuild operation by periodically performing steps including i) calculating (e.g. by Rebuild Rate Calculating Logic 172) a Target Rebuild Rate 174 that enables data previously stored on the failed Drive 166 to be completely rebuilt on Drive(s) 169 within an expected drive rebuild time window, ii) calculating (e.g. by Drive Rebuild Parameter Calculating Logic 176) a new value for at least one Drive Rebuild Parameter(s) 178 based on a) a value for the drive rebuild parameter corresponding to the Target Rebuild Rate 174 indicated by a static rebuild rate data structure (e.g. by Rebuild Rate Table 177) and b) a current level of host I/O (Input/Output) activity, and iii) rebuilding (e.g. by the Rebuild Jobs 182) the data previously stored in drive extents located on the failed Drive 166 on drive extents located on Drive(s) 169 for a predetermined time period (e.g. some number of seconds) with the at least one Drive Rebuild Parameter(s) 178 set to the new value.

For example, in response to detecting the failure of Drive 166, Drive Rebuild Logic 170 may determine that the data previously stored on failed Drive 166 (e.g. data previously stored in drive extents located on Drive 166) is to be rebuilt on one or more other non-volatile data storage drives (e.g. on drive extents located on Drive(s) 169 or one or more other surviving non-volatile data storage drives) within an expected amount of time (e.g. the "expected drive rebuild time window", also referred to as T_RB_EXPECTED) following the failure of Drive 166, in order to provide an expected level of reliability.

The drive rebuild operation performed by Drive Rebuild Logic 170 in response to detecting the failure of Drive 166 may periodically execute Rebuild Rate Calculating Logic 172, Drive Rebuild Parameter Calculating Logic 176, and Rebuild Jobs 182. For example, each time it is executed, Rebuild Rate Calculating Logic 172 calculates a minimum target rebuild rate (e.g. Target Rebuild Rate 174 as shown in FIG. 1, also referred to as RB_TARGET_RATE) that is necessary to complete the rebuild within T_RB_EXPECTED from the current point in time, based on a percentage (e.g. x %) of the data previously stored on the failed data storage drive (e.g. failed Drive 166) that has been successfully rebuilt on the at least one other data storage drive (e.g. Drive(s) 169) at that point in time, and an amount of time that has elapsed (e.g. T_RB_ELAPSED) since the drive rebuild operation began, e.g. since the time when the failure of Drive 166 was detected. Initially, before any data has been rebuilt, Rebuild Rate Calculating Logic 172 may calculate an initial RB_TARGET_RATE based on factors such the total amount of data to be rebuilt (e.g. the total amount of valid data previously stored on failed Drive 166), the specific number of non-volatile data storage drives impacted during the rebuild operation, and/or other factors. Example values of RB_TARGET_RATE include specific target rebuild rates of one or more gigabytes per second.

At each subsequent point in time at which Rebuild Rate Calculating Logic 172 is executed during the drive rebuild time window, Drive Rebuild Rate Calculating Logic 172 calculates a new value for RB_TARGET_RATE (e.g. RB_TARGET_RATE') based on the percentage (e.g. x %) of the data previously stored on the failed data storage drive (e.g. failed Drive 166) that has been successfully rebuilt on the at least one other data storage drive (e.g. on Drive(s) 169) at that point in time, and on an amount of time that has elapsed (e.g. T_RB_ELAPSED) since the beginning of the drive rebuild operation (e.g. since the failure of Drive 166 was detected), as follows:

$$RB\_TARGET\_RATE' = (T\_RB\_EXPECTED * (1-x\%)) / (T\_RB\_EXPECTED - T\_RB\_ELAPSED) * RB\_TARGET\_RATE$$

In the example of FIG. 1, each time a new value for RB_TARGET_RATE is calculated by Rebuild Rate Calculating Logic 172, it is passed to Drive Rebuild Parameter Calculating Logic 176 as Target Rebuild Rate 174.

When Drive Rebuild Parameter Calculating Logic 176 receives Target Rebuild Rate 174 from Rebuild Rate Calculating Logic 172, it uses Target Rebuild Rate 174 to calculate a new value for at least one drive rebuild parameter based on i) a value for the drive rebuild parameter corresponding to Target Rebuild Rate 174 indicated by a static rebuild rate data structure, and ii) a current level of host I/O (Input/Output) activity being experienced by Storage Processor 120 and/or Data Storage System 116. For example, Drive Rebuild Parameter Calculating Logic 176 may use Target Rebuild Rate 174 to calculate a new value for at least one drive rebuild parameter based on a value for the drive rebuild parameter corresponding to Target Rebuild Rate 174 that is indicated by Rebuild Rate Table 177, and a current level of host I/O (Input/Output) activity being experienced by Storage Processor 120 and/or Data Storage System 116.

In the example of FIG. 1, each time Drive Rebuild Parameter Calculating Logic 176 calculates a new value for the at least one drive rebuild parameter, it outputs the new value(s) as Rebuild Parameter(s) 178. Drive Rebuild Logic 170 then uses Rebuild Parameter(s) 178 to execute Rebuild Jobs 182 for a period of time (e.g. a predetermined number of seconds) using the values of Rebuild Parameter(s) 178 that are output by Drive Rebuild Parameter Calculating Logic 176. For example, Drive Rebuild Logic 170 may use the new value(s) for Rebuild Parameter(s) 178 to execute multiple rebuild jobs in parallel (e.g. rebuild jobs 184, 185, 186, and so on, shown in Rebuild Jobs 182) for a predetermined period of time. After Rebuild Jobs 182 are executed for the predetermined period of time using the new value(s) for Rebuild Parameter(s) 178, control passes back to Rebuild Rate Calculating Logic 172, for calculation of a new Target Rebuild Rate 174 to pass to Drive Rebuild Parameter Calculating Logic 176, which generates another set of new values for Rebuild Parameter(s) 178, which are then used to again execute Rebuild Jobs 182, but this time using the new values for Rebuild Parameter(s) 178 generated by Drive Rebuild Parameter Calculating Logic 176. This sequence of executing Rebuild Rate Calculating Logic 172, Drive Rebuild Parameter Calculating Logic 176, and Rebuild Jobs 182, is repeated until all data previously stored on the failed Drive 166 is completely rebuilt onto the one or more other drive(s), e.g. onto drive extents located on Drive(s) 169.

In some embodiments, rebuilding the data previously stored on Drive 166 on the Drive(s) 169 by Rebuild Jobs 182 using a new value for Rebuild Parameter(s) 178 during the predetermined time period includes executing the multiple rebuild jobs in Rebuild Jobs 182 in parallel during the predetermined time period. In such embodiments, Rebuild Parameter(s) 178 includes a rebuild parameter indicating a total number of the processor cores within Processor Cores 125 on which individual drive rebuild jobs in Rebuild Jobs 182 are to be simultaneously scheduled for execution (e.g. by Drive Rebuild Logic 170) in parallel during the predetermined time period.

In some embodiments, Drive Rebuild Parameter Calculating Logic 176 determines a current level of host I/O activity at least in part by detecting a number of the processor cores within Processor Cores 125 that are not currently performing host I/O processing, e.g. the number of processing cores in Processor Cores 125 that are not currently being used to execute instructions that process Host I/O Requests 112. In such embodiments, Drive Rebuild Parameter Calculating Logic 176 may calculate the new value for the total number of processor cores on which corresponding individual drive rebuild jobs are scheduled for execution in parallel during the predetermined time period by comparing the number of processor cores that are not currently performing host I/O processing (e.g. the total number of processing cores within Processor Cores 125 that are not currently being used to process Host I/O Requests 112) to a value for a drive rebuild parameter indicating the total number of processor cores on which corresponding individual drive rebuild jobs are to be scheduled for execution in parallel during the predetermined time period that is indicated by Static Rebuild Rate Table 177 for the current value of Target Rebuild Rate 174. In response to detecting that the total number of processor cores within Processor Cores 125 that are not currently performing host I/O processing (e.g. that are currently not executing instructions that perform processing of Host I/O Requests 112) exceeds the value for the drive rebuild parameter indicating the total number of processor cores on which corresponding individual drive rebuild jobs are to be scheduled for execution in parallel during the predetermined time period that is indicated by Static Rebuild Rate Table 177 for the current value of Target Rebuild Rate 174, Drive Rebuild Parameter Calculating Logic 176 may set the new value of the drive rebuild parameter Rebuild Parameter(s) 178 indicating the total number of processor cores in Processor Cores 125 on which corresponding individual drive rebuild jobs are to be scheduled for execution in parallel to the total number of processor cores within Processor Cores 125 that are currently not performing host I/O processing, instead of using the value for the drive rebuild parameter indicating the total number of processor cores on which corresponding individual drive rebuild jobs are to be scheduled for execution in parallel during the predetermined time period that is indicated by Static Rebuild Rate Table 177 for the current value of Target Rebuild Rate 174.

In some embodiments, each one of the rebuild jobs in Rebuild Jobs 178 may rebuild the data previously stored on the failed data storage drive (e.g. Drive 166) at least in part by rebuilding data previously stored in multiple physical blocks in parallel. Each set of multiple physical blocks that are rebuilt in parallel are that are contained in a single RAID extents that has a set of drive extents containing a drive extent located on the failed data storage drive. In such embodiments, Rebuild Parameter(s) 178 may include a drive rebuild parameter indicating a total number of physical blocks for which data is to be rebuilt in parallel by a rebuild job during the predetermined time period. For example, each set of physical blocks for which data is rebuilt in parallel consists of physical blocks that are all contained in a single RAID extent that is being rebuild by a corresponding one of the rebuild jobs in Rebuild Jobs 182 during the predetermined time period.

In some embodiments, Rebuild Rate Table 177 may be a table of data elements storing rebuild rates. In such embodiments, Drive Rebuild Parameter Calculating Logic 176 may search Rebuild Rate Table 177 within Target Rebuild Rate 174 to determine a data element in Rebuild Rate Table 177 that stores a rebuild rate that is equal to Target Rebuild Rate 174. Drive Rebuild Parameter Calculating Logic 176 may then determine the value or values for Rebuild Parameter(s) 178 as at least one of the indices of the data element in Rebuild Rate Table 177 that stores the rebuild rate equal to Target Rebuild Rate 174. For example, a new value for a first one of the Rebuild Parameter(s) 178 (e.g. total number of processor cores on which corresponding individual drive rebuild jobs are to be scheduled for execution in parallel) may be set to a first index (e.g. a column index) of the rebuild rate equal to Target Rebuild Rate 174, and a new value of a second one of the Rebuild Parameter(s) 178 (e.g. total number of physical blocks for which data is to be rebuilt in parallel by a rebuild job) may be set to a second index (e.g. a row index) indicating a data element (or "field", "cell", etc.) contained in Rebuild Rate Table 177 that stores a rebuild rate equal to Target Rebuild Rate 174.

As described herein, data previously stored on the failed data storage drive is protected using mapped RAID (Redundant Array of Independent Disks) data protection provided by multiple RAID extents, e.g. by each one of the multiple RAID extents having a drive extent located on the failed data storage drive within their corresponding drive extent set. In some embodiments, each one of the drive rebuild jobs in Rebuild Jobs 182 rebuilds only data previously stored in a single one of the multiple RAID extents that each have a drive extent located on the failed data storage drive contained within their corresponding drive extent set. Accordingly, each one of the rebuild jobs in Rebuild Jobs 182 may rebuild only data stored in a single RAID extent.

In some embodiments, each one of the individual drive rebuild jobs in Rebuild Jobs 182 is executed on a corresponding one of the processor cores in Processor Cores 125 at a higher execution priority than the priority of one or more processes that process host I/O, e.g. at a higher priority than the priority assigned to processing of Host I/O Requests 112. Accordingly, in the event that one of the drive rebuild jobs in Rebuild Jobs 182 is scheduled for execution on one of the processor cores in Processor Cores 125, and a process that processes Host I/O Requests 112 is also scheduled for execution on that same processor core, the drive rebuild job will be executed prior to the process that processes the received host I/O.

In some embodiments, drive rebuild jobs are assigned to corresponding processor cores within Processor Cores 125 according to a first ordering of the processor cores within Processor Cores 125. In such embodiments, any processes that process Host I/O Requests 112 may be assigned to processor cores within Processor Cores 125 according to a second ordering of the processor cores within Processor Cores 125. For example, the second ordering of the processor cores within Processor Cores 125 may be a reverse order with respect to the first ordering of the processor cores within the set of processor cores, e.g. the second ordering of the processor cores (e.g. a descending order) may be the opposite of the first ordering of the processor cores (e.g. an ascending order).

Figure 2:
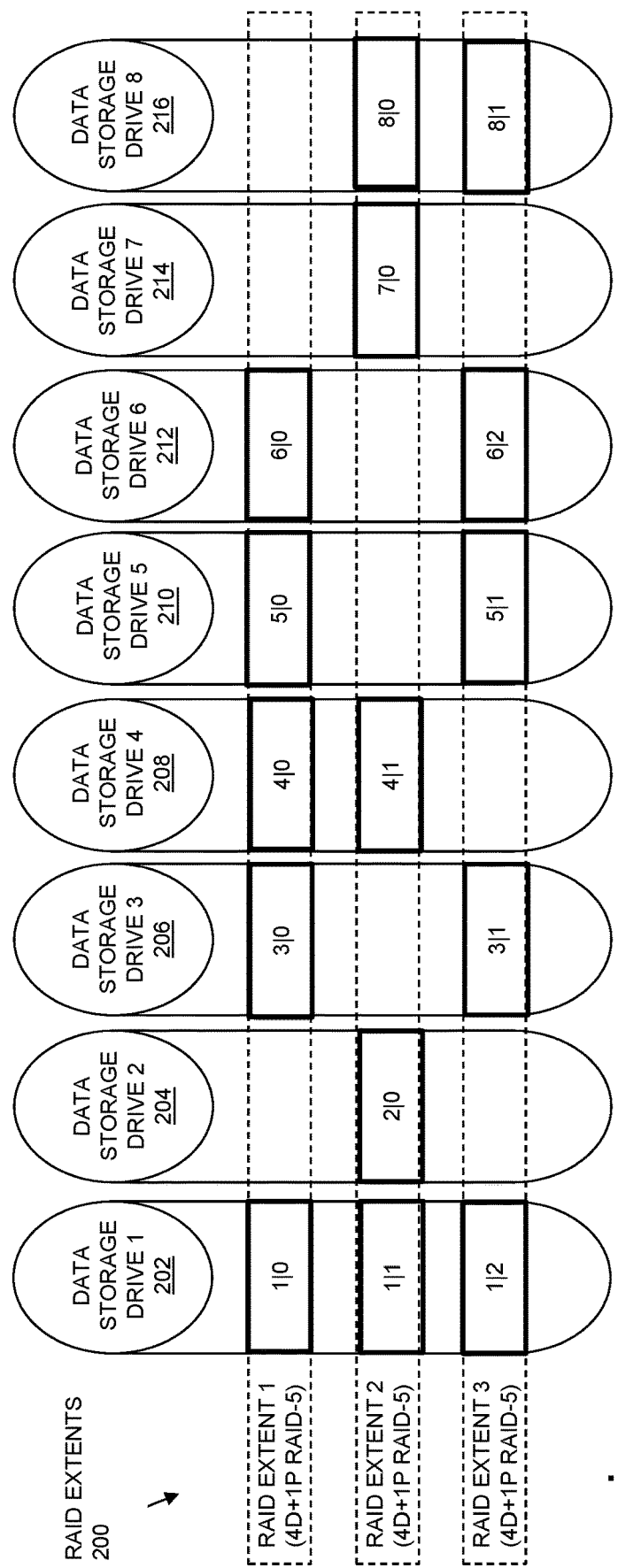
FIG. 2 is a block diagram showing an example of RAID extents provided using mapped RAID technology.

FIG. 2 is a block diagram showing an example of sets of drive extents that are assigned and mapped to individual RAID extents within a set of RAID extents (e.g. RAID Extents 200) that are used to store host data and/or metadata that is written to logical block addresses within a logical address space. In the example of FIG. 2, RAID Extents 200 include a RAID Extent 1, RAID Extent 2, and RAID Extent 3, and some number of other RAID extents. In the example of FIG. 2, each of the RAID extents in RAID Extents 200 provides the same level of RAID protection, e.g. 4 D+1 P RAID-5 level RAID protection. Other RAID levels may be provided in the alternative. Further in the example of FIG. 2, for purposes of concise illustration the drive extents are shown mapped to the RAID extents from eight non-volatile data storage drives, shown by Storage Drive 1 202, Storage Drive 2 204, Storage Drive 3 206, Storage Drive 4 208, Storage Drive 5 210, Storage Drive 6 212, Storage Drive 7 214, and Storage Drive 8 216. Any specific number of non-volatile data storage drives may be used in the alternative. In order to provide 4 D+1 P RAID-5 level RAID protection, each RAID extent is mapped to a set of five drive extents. For example, RAID Extent 1 is mapped to a set of five drive extents including a first drive extent 1|0, which is the first drive extent in Storage Drive 1 202, a second drive extent 3|0, which is the first drive extent in Storage Drive 3 206, a third drive extent 4|0, which is the first drive extent in Storage Drive 4 208, a fourth drive extent 5|0, which is the first drive extent in Storage Drive 5 210, and a fifth drive extent 6|0, which is the first drive extent in Storage Drive 6 212.

Also for example, RAID Extent 2 is mapped to a set of five drive extents including a first drive extent 1|1, which is the second drive extent in Storage Drive 1202, a second drive extent 2|0, which is the first drive extent in Storage Drive 2 204, a third drive extent 4|1, which is the second drive extent in Storage Drive 4 208, a fourth drive extent 7|0, which is the first drive extent in Storage Drive 7 214, and a fifth drive extent 8|0, which is the first drive extent in Storage Drive 8 216.

Further for example, RAID Extent 3 is mapped to a set of five drive extents including a first drive extent 1|2, which is the third drive extent in Storage Drive 1 202, a second drive extent 3|1, which is the second drive extent in Storage Drive 3 206, a third drive extent 5|1, which is the second drive extent in Storage Drive 5 210, a fourth drive extent 6|2, which is the third drive extent in Storage Drive 6 212, and a fifth drive extent 8|1, which is the second drive extent in Storage Drive 8 216.

Figure 3:
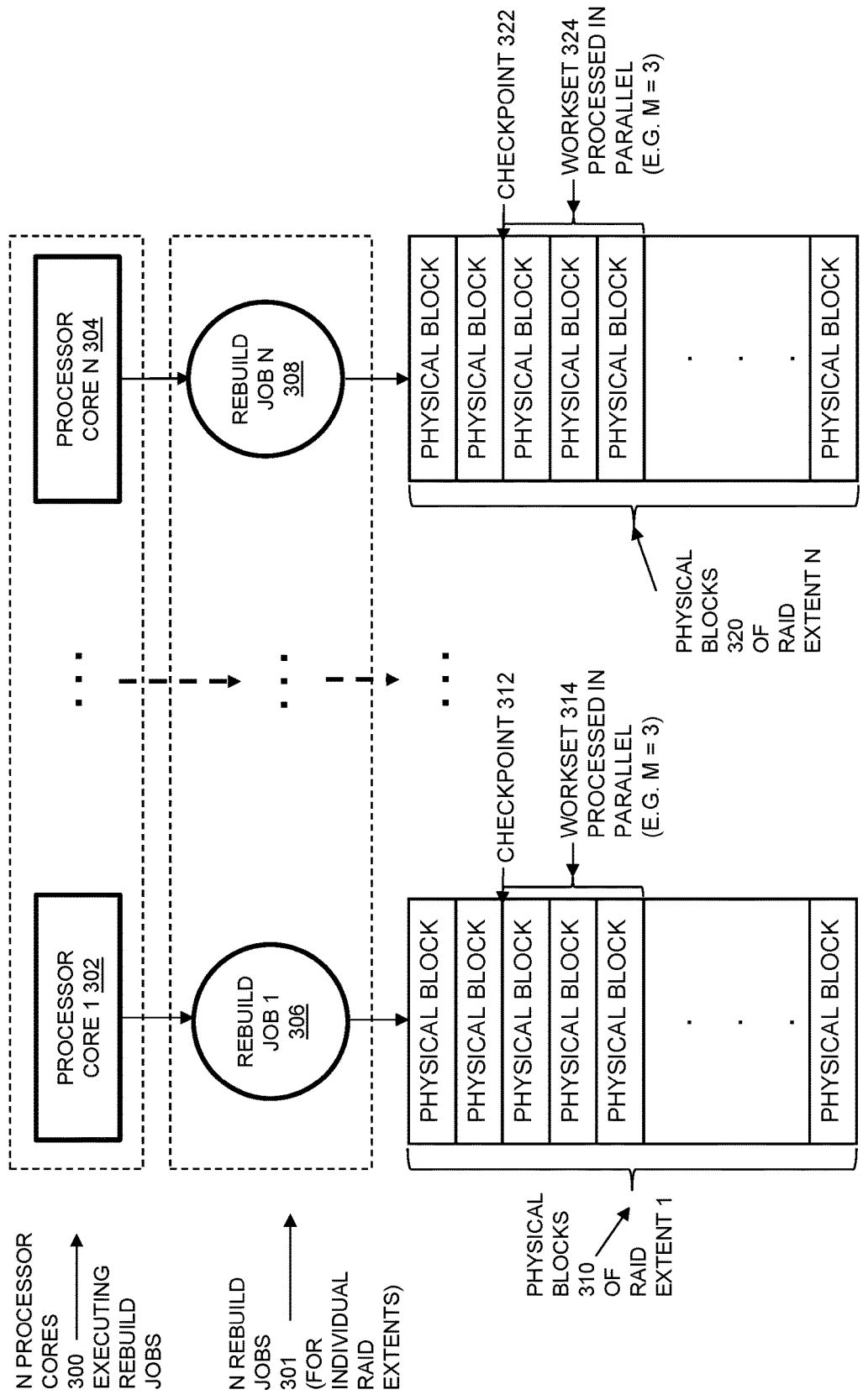
FIG. 3 is a block diagram showing an example of multiple RAID extent specific drive rebuild jobs executing concurrently on respective processor cores during rebuild of a failed data storage drive in some embodiments.

FIG. 3 is a block diagram showing an example of multiple RAID extent specific drive rebuild jobs executing concurrently on respective processor cores during rebuild of data previously stored on a failed data storage drive. In the example of FIG. 3, the total number of processor cores on which corresponding individual drive rebuild jobs are scheduled for execution in parallel is N. As shown in FIG. 3, N Processor Cores 300 (e.g. Processor Core 1 302 through Processor Core N 304) concurrently execute N Rebuild Jobs 301 (e.g. Rebuild Job 1 306 through Rebuild Job N 308). Each one of the processor cores executes a single corresponding rebuild job. Each one of the rebuild jobs rebuilds the data previously stored in the physical blocks contained in a single RAID extent, e.g. Rebuild Job 1 306 rebuilds the data previously stored in the Physical Blocks 310 that are contained in RAID extent 1, and so on, through Rebuild Job N 308, which rebuilds data previously stored in the Physical Blocks 320 that are contained in RAID extent N. Each one of the N Rebuild Jobs 301 rebuilds in parallel the data previously stored in up to a maximum of M physical blocks that are contained in the RAID extent that is being rebuilt by that rebuild job. For example, in FIG. 3, M is equal to 3, and accordingly each one of the rebuild jobs in N Rebuild Jobs 301 concurrently rebuilds data previously stored in up to a maximum of 3 physical blocks contained in the RAID extent being rebuilt by that rebuild job. Accordingly, Rebuild Job 1 306 concurrently rebuilds data stored in up to a maximum of 3 physical blocks in Physical Blocks 310, as shown for purposes of illustration by Workset 314. In the example of FIG. 3, Workset 314 shows that the data previously stored in three physical blocks that are contained in RAID extent 1 is currently being rebuilt in parallel by Rebuild Job 1 306. Checkpoint 312 indicates how far in the Physical Blocks 310 of RAID extent 1 that Rebuild Job 1 306 has progressed so far with regard to completing the data rebuilding within RAID extent 1. Similarly, Rebuild Job N 308 concurrently rebuilds data stored in a maximum of 3 physical blocks in Physical Blocks 310, as shown by Workset 324, which shows that data stored in three physical blocks contained in RAID extent N is currently being rebuilt in parallel by Rebuild Job N 308. The Checkpoint 322 indicates how far in the Physical Blocks 320 Rebuild Job N 308 has progressed with regard to completing the data rebuilding within RAID extent N.

Figure 4:
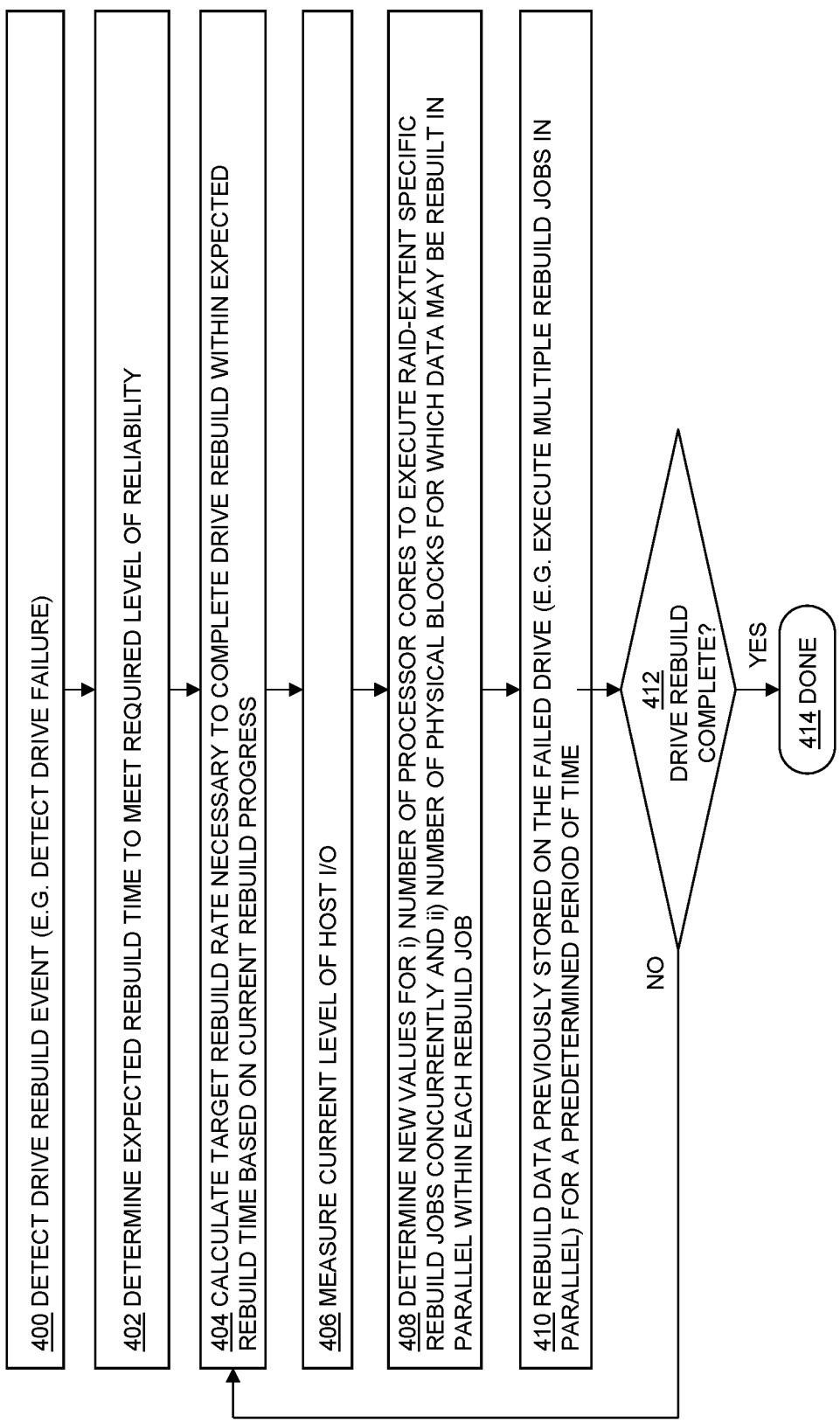
FIG. 4 is a flow chart showing an example of steps performed in some embodiments to rebuild data previously stored on a failed data storage drive.

FIG. 4 is a flow chart showing an example of steps performed in some embodiments to rebuild data previously stored on a failed data storage drive. As shown in FIG. 4, at step 400, the disclosed technology (e.g. Drive Rebuild Logic 170) detects a drive rebuild event, such as failure of a non-volatile data storage drive in Physical Non-Volatile Data Storage Drives 128 (e.g. the failure of Drive 166).

At step 402, the disclosed technology (e.g. Rebuild Rate Calculating Logic 172) determines an expected rebuild time (e.g. T_RB_EXPECTED) within which the data previously stored on the failed data storage drive must be rebuilt in order to meet a required level of reliability.

Steps 404 through 412 illustrate actions that are performed periodically by the disclosed technology during a rebuild operation that rebuilds the data previously stored on the failed data storage drive (e.g. 166) onto one or more other, surviving data storage drives (e.g. Drive(s) 169).

At step 404, the disclosed technology (e.g. Rebuild Rate Calculating Logic 172) calculates a target rebuild rate (e.g. Target Rebuild Rate 174) that is necessary to complete the rebuilding of the data previously stored on the failed data storage drive onto one or more other data storage drives within the expected rebuild time, based in part on how much rebuild progress has been made as of the current time.

At step 406, the disclosed technology (e.g. Drive Rebuild Parameter Calculating Logic 176) measures a current level of host I/O. Step 406 may include determining a total number of processor cores that are not currently processing host I/O (e.g. the total number of processor cores in Processor Cores 125 minus the number of processor cores in Processor Cores 125 that are currently being used to process Host I/O Requests 112).

At step 408, the disclosed technology (e.g. Drive Rebuild Parameter Calculating Logic 176) uses a static rebuild rate data structure (e.g. Rebuild Rate Table 177) to determine new values for two drive rebuild parameters, based on the target rebuild rate and the current level of host I/O. The new values determined at step 408 enable the drive rebuild to be performed at a rate that is at least as high as the target rebuild rate, which is a minimum rebuild rate. For example, at step 408 new values may be calculated for the following drive rebuild parameters: i) a total number of processor cores (e.g. within Processor Cores 125) on which individual RAID extent specific rebuild jobs are to be executed concurrently, and ii) a maximum number of physical blocks for which previously stored data is to be rebuilt in parallel within each rebuild job. For example, minimum values for the new values of the drive rebuild parameters may be determined at step 408, e.g. as the indices of an element in Rebuild Rate Table 177 that stores a value equal to the target rebuild rate. For example, a minimum value for the total number of processor cores on which individual RAID extent specific rebuild jobs are executed concurrently may be equal to an index (e.g. the column number) of the column in Rebuild Rate Table 177 that contains the element that stores the value equal to the target rebuild rate. In another example, a minimum value for the maximum number of physical blocks for which previously stored data is to be rebuilt in parallel within each rebuild job may be equal to an index (e.g. the row number) of the row in Rebuild Rate Table 177 containing the element that stores the value equal to the target rebuild rate.

The actual new values determined for the drive rebuild parameters at step 408 may be set to values higher than the minimum values for those parameters, depending on the current level of host I/O measured at step 406. For example, in the case where the total number of processor cores that are not currently processing host I/O is higher than the minimum value for the total number of processor cores on which individual RAID extent specific rebuild jobs are executed concurrently, then the value for the total number of processor cores on which individual RAID extent specific rebuild jobs are executed concurrently that is determined at step 408 may be set to the total number of processor cores that are not currently processing host I/O, and the value for the maximum number of physical blocks for which previously stored data is to be rebuilt in parallel within each rebuild job may be set to a predetermined maximum value.

At step 410, the disclosed technology (e.g. Drive Rebuild Logic 170) rebuilds data previously stored on the failed data storage drive for a predetermined period of time (e.g. for some number of seconds) using the new values of the drive rebuild parameters calculated at step 408. For example, data previously stored on the failed data storage drive may be rebuilt in step 410 by multiple RAID extent specific rebuild jobs (e.g. Rebuild Jobs 182) that are all executed in parallel on corresponding processor cores, and one of the drive rebuild parameters may indicate a total number of processor cores that are used to execute corresponding RAID extent specific rebuild jobs during step 410. Accordingly, the new value determined at step 408 for the drive rebuild parameter indicating the total number of processor cores used to execute RAID extent specific rebuild jobs may be used in step 410 to determine the number of processor cores on which RAID extent specific rebuild jobs are scheduled for execution during the predetermined period of time. In another example, the new value determined at step 408 for the drive rebuild parameter indicating the maximum number of physical blocks for which previously stored data is to be rebuilt in parallel within each rebuild job may be used in step 410 to set a limit on the maximum number of physical blocks for which previously stored data may be rebuilt in parallel within each rebuild job during the predetermined period of time.

After data previously stored on the failed data storage drive has been rebuilt for some time (e.g. for the predetermined period of time), step 410 is followed by step 412, in which the disclosed technology (e.g. Drive Rebuild Logic 170) determines whether all data previously stored on the failed data storage drive has been successfully rebuilt. If so, then the drive rebuild operation is complete, and step 412 is followed by step 414. Otherwise, step 412 is followed by step 404, and steps 404 through 412 are repeated until all the data previously stored on the failed data storage drive has been rebuilt.

Figure 5:
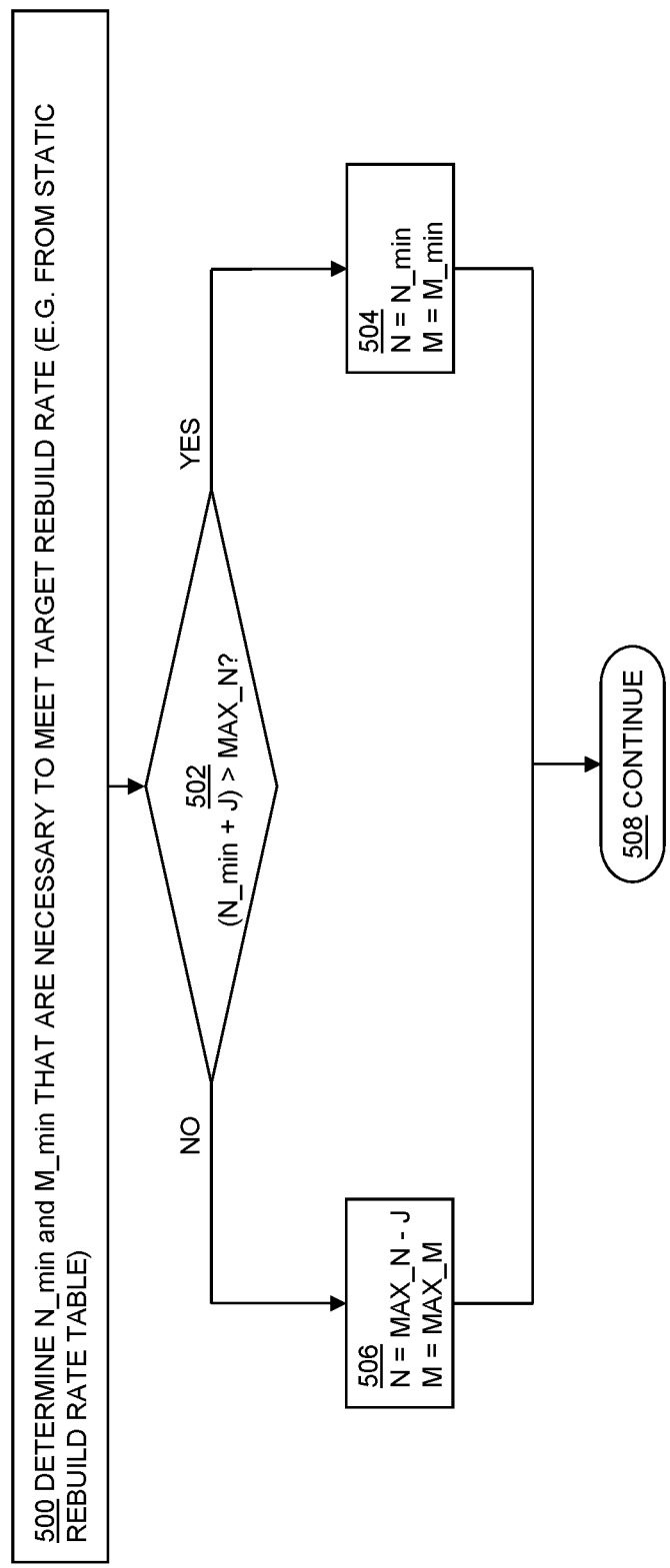
FIG. 5 is a flow chart showing an example of steps performed in some embodiments to determine the number of RAID extent specific drive rebuild jobs to be executed concurrently and the number of physical blocks of storage for which data is to be rebuilt in parallel within each rebuild job while rebuilding data previously stored on a failed data storage drive.

FIG. 5 is a flow chart showing an example of steps performed in some embodiments to determine the total number of processor cores on which RAID extent specific drive rebuild jobs are to be executed concurrently and the maximum number of physical blocks of storage for which data is to be rebuilt in parallel within each rebuild job. The steps of FIG. 5 may, for example, be performed in whole or in part by Drive Rebuild Parameter Calculation Logic 176. With reference to the examples shown in FIGS. 5-9 and described below, the following terminology is used:

N=the new value calculated at step 408 of FIG. 4 for a drive rebuild parameter that indicates the total number of processor cores on which RAID extent specific rebuild jobs are concurrently executed during step 410 of FIG. 4.

M=the new value calculated at step 408 of FIG. 4 for a drive rebuild parameter indicating the maximum number of physical blocks for which data may be rebuilt in parallel within each individual rebuild job during step 410 of FIG. 4.

MAX_N=the total number of processor cores within the data storage system (e.g. within one or more storage processors of a data storage system).

J=the number of the processor cores that are currently being used to process host I/O (e.g. as detected at step 406 of FIG. 4).

MAX_M=a predetermined maximum possible value of M.

At step 500, the disclosed technology determines values N_min (a current minimum value for N) and M_min (a current minimum value for M) that are necessary to meet the target rebuild rate (e.g. Target Rebuild Rate 174). For example, the values N_min and M_min may be determined by searching Rebuild Rate Table 177 for a data element in the table that stores a value that is equal to Target Rebuild Rate 174, and then setting N_min to a first index of that data element (e.g. to the number of the column containing the data element), and setting M_min to a second index of that data element (e.g. to the number of the row containing the data element).

At step 502, the disclosed technology determines whether the number of processor cores not currently being used to process host I/O is greater than N_min. If so, step 502 is followed by step 506. Otherwise, step 502 is followed by step 504. For example, the disclosed technology may compare the sum of N_min and J to MAX_N. If the sum of N_min and J is greater than MAX_N, then step 502 is followed by step 504. Otherwise, step 502 is followed by step 506.

At step 504, N is set to N_min, and M is set to M_min.

At step 506, N is set to the difference between MAX_N and J, and M is set to M_MAX.

Both step 504 and step 506 are followed by step 508. At step 508 the disclosed technology continues, e.g. by using N and M to indicate new values for rebuild parameters (e.g. within Rebuild Parameter(s) 178) that are subsequently used when executing multiple rebuild jobs (e.g. Rebuild Jobs 182) for a predetermined period of time (e.g. as in step 410 of FIG. 4).

FIG. 6 is a block diagram showing an example of a static rebuild rate data structure in some embodiments. Rebuild Rate Table 600 is an example of Rebuild Rate Table 177 shown in FIG. 1. Rebuild Rate Table 600 contains multiple data elements, each of which stores a value V(N,M) that is the rebuild rate achieved when i) the total number of processor cores on which corresponding individual drive rebuild jobs are scheduled for execution in parallel is equal to the column index N of that data element, and ii) the total number of physical blocks for which data is rebuilt in parallel by each one of the rebuild jobs is equal to the row index M of that data element. Accordingly, as shown in FIG. 6, the rebuild rate values stored in the data elements of Rebuild Rate Table 600 increase with increasing values of N and M, from a lowest rebuild rate value V(1,1) that is stored in the data element with a column index of 1 and a row index of 1, up to a highest rebuild rate value V(MAX_N, MAX_M) that is stored in the data element with a column index of MAX_N and a row index of MAX_M.

Figure 7:
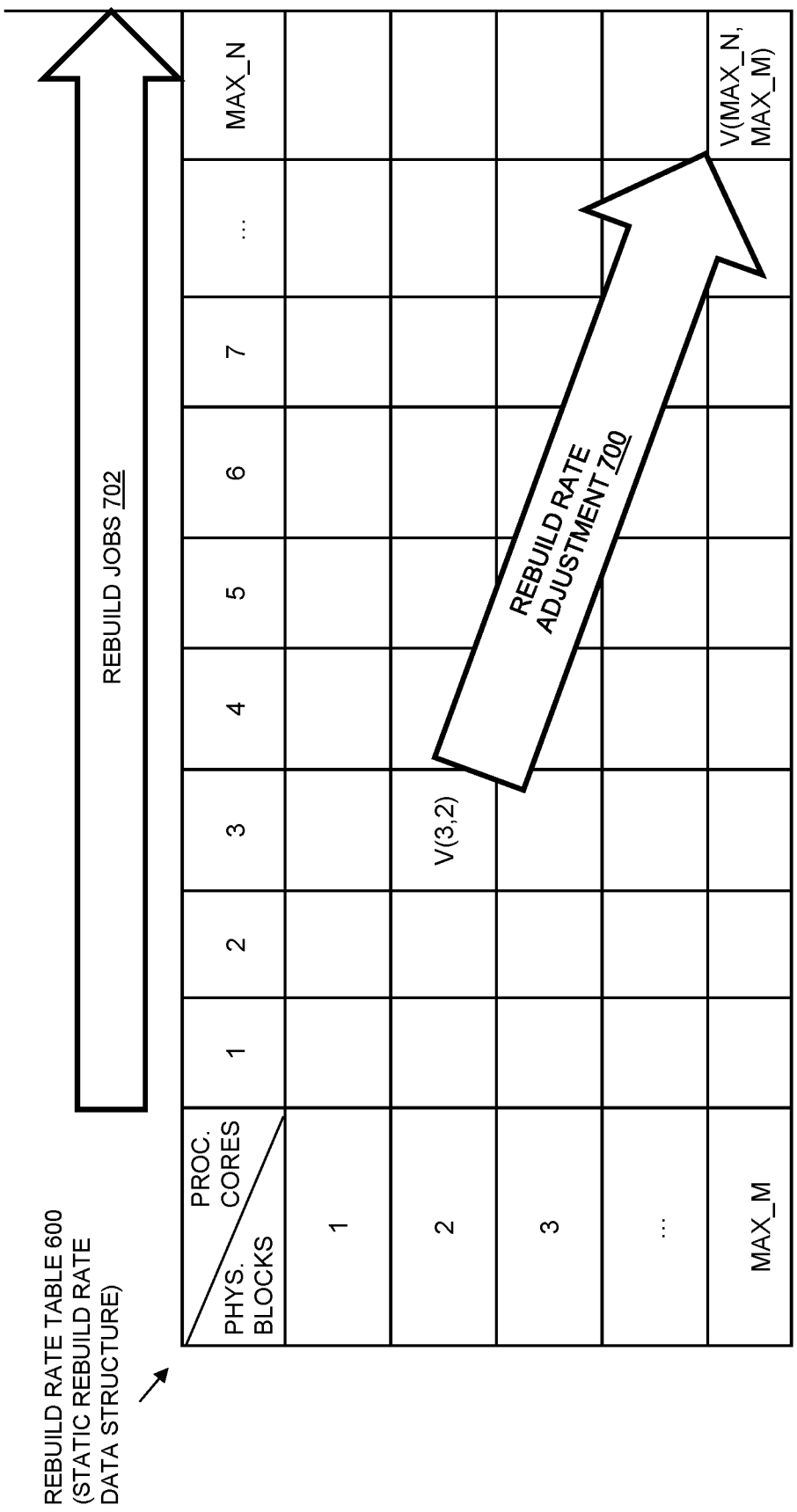
FIG. 7 is a block diagram showing the rebuild rate data structure of FIG. 6, and illustrating operation of some embodiments in response to detecting that host I/O processing is not currently being performed on any processor cores.

FIG. 7 is a block diagram showing the Rebuild Rate Table 600 shown in FIG. 6, and illustrating operation of some embodiments in response to detecting that host I/O processing is not currently being performed on any processor cores. In the operational example shown in FIG. 7, the disclosed technology (e.g. Drive Rebuild Parameter Calculating Logic 176) determines that the rebuild rate value V(3,2), stored in the data element of Rebuild Rate Table 600 having a column index of 3 and a row index of 2, matches the target rebuild rate. The disclosed technology also determines that host I/O processing is not currently being performed on any processor cores. Accordingly, the value of N_min is 3, the value of J is 0, and a Rebuild Rate Adjustment 700 is performed (e.g. as in step 506 of FIG. 5) that sets N to MAX_N and M to MAX_M. As a result, the rebuild operation is performed for a predetermined period of time using all the processor cores in the data storage system to execute rebuild jobs, as shown in FIG. 7 by Rebuild Jobs 702, and the maximum number of physical blocks for which data is rebuilt in parallel by each rebuild job during the predetermined time period is equal to MAX_M.

Figure 8:
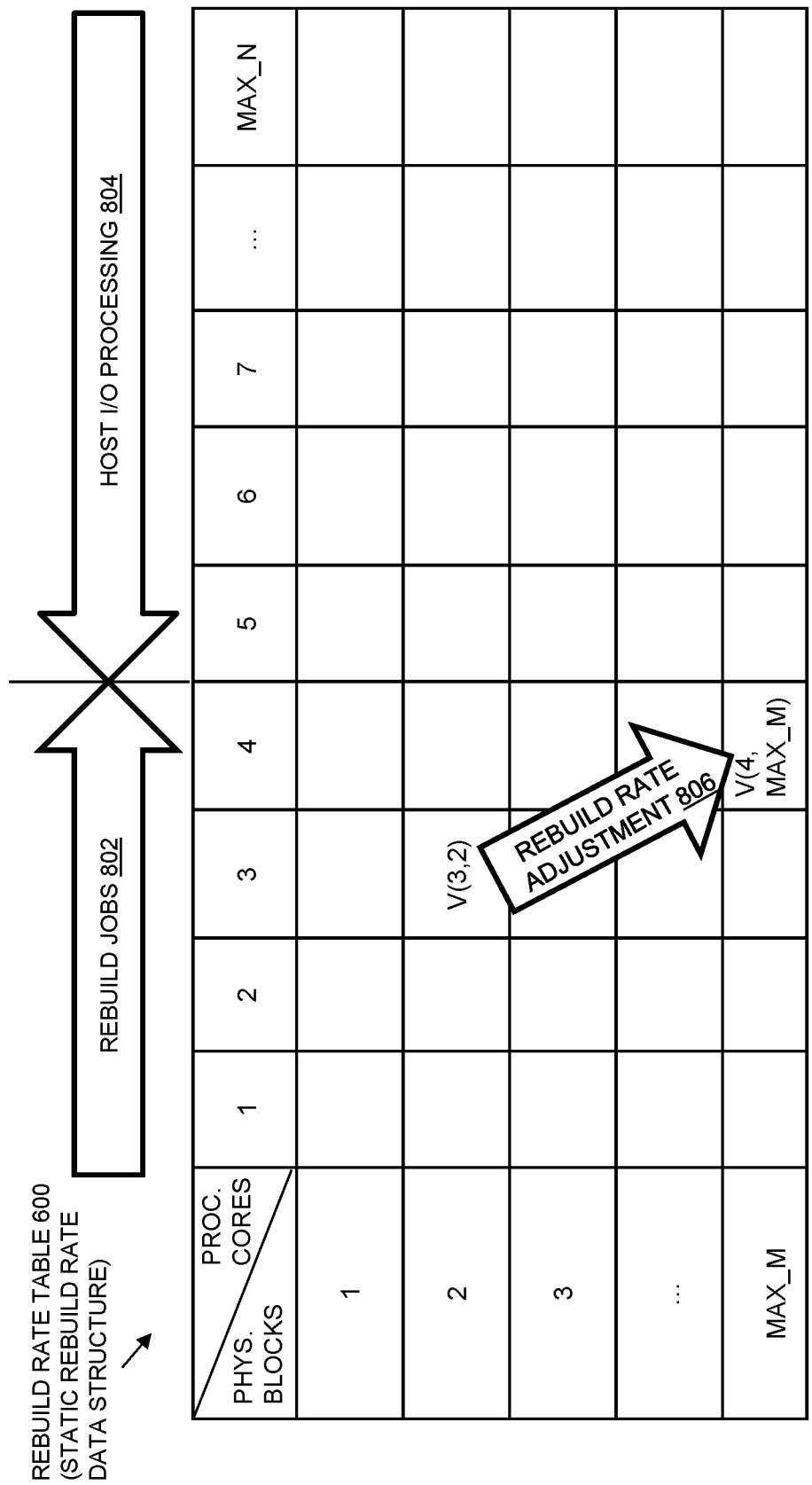
FIG. 8 is a block diagram showing the rebuild rate data structure of FIG. 6, and illustrating operation of some embodiments in response to detecting that the number of processor cores on which host I/O processing is not currently being performed exceeds the number of processor cores indicated by the rebuild rate data structure for execution of drive rebuild jobs.
Figure 9:
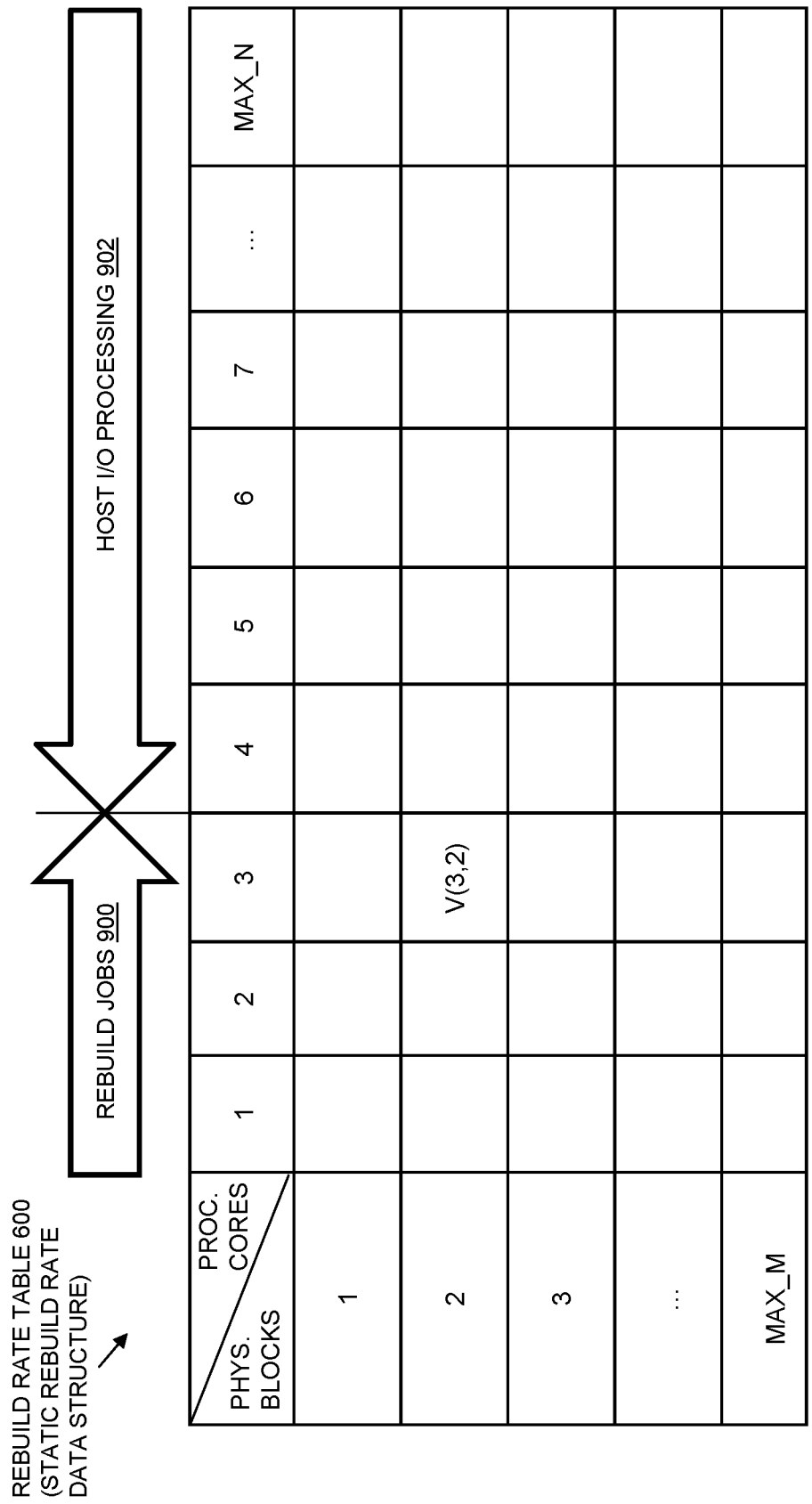
FIG. 9 is a block diagram showing the rebuild rate data structure of FIG. 6, and illustrating operation of some embodiments in response to detecting that the number of processor cores on which host I/O processing is not currently being performed is equal to the number of processor cores indicated by the rebuild rate data structure for execution of drive rebuild jobs.

FIG. 8 is a block diagram showing the rebuild rate data structure of FIG. 6, and illustrating operation of some embodiments in response to detecting that the number of processor cores on which host I/O processing is not currently being performed exceeds the number of processor cores indicated by the rebuild rate data structure for execution of drive rebuild jobs. FIGS. 8 and 9 illustrate how in some embodiments, Rebuild Jobs 802 may be assigned to processor cores based on a first ordering of the processor cores, starting from a lowest processor core number (e.g. 1) and continuing upwards, while Host I/O Processing 804 may assigned to processor cores based on a second ordering of the processor cores, starting from a highest processor core number (e.g. MAX_N) and continuing downwards, where the second ordering is a reverse of the first ordering.

In the operational example shown in FIG. 8, the disclosed technology (e.g. Drive Rebuild Parameter Calculating Logic 176) determines that the rebuild rate value V(3,2), stored in the data element of Rebuild Rate Table 600 having a column index of 3 and a row index of 2, matches the target rebuild rate. The disclosed technology also determines that host I/O processing is being performed on the processor cores from processor core MAX_N downwards through processor core number 5. The value of N_min is 3, the value of J is MAX_N minus 4, N_min+J is not greater than MAX_N, and accordingly a Rebuild Rate Adjustment 806 is performed (e.g. as in step 506 of FIG. 5) that sets N to N_min (e.g. 4). M may also be increased by Rate Adjustment 806, e.g. to MAX_M, or may remain set to M_min, which in this case is 2. As a result, the rebuild operation is performed for a predetermined period of time using four processor cores (e.g. processor cores 1-4 as shown by Rebuild Jobs 802) to execute rebuild jobs, and the maximum number of physical blocks for which data is rebuilt in parallel by each rebuild job during the predetermined time period may be equal to MAX_M or M_min (e.g. 2). Host I/O processing is performed during the redetermined time period on the remaining processor cores, i.e. the processor cores from processor core MAX_N down through processor core 5, as shown by Host I/O Processing 804.

FIG. 9 is a block diagram showing the rebuild rate data structure of FIG. 6, and illustrating operation of some embodiments in response to detecting that the number of processor cores on which host I/O processing is not currently being performed is equal to the number of processor cores indicated by the rebuild rate data structure for execution of drive rebuild jobs. In the operational example shown in FIG. 9, the disclosed technology (e.g. Drive Rebuild Parameter Calculating Logic 176) determines that the rebuild rate value V(3,2), stored in the data element of Rebuild Rate Table 600 having a column index of 3 and a row index of 2, matches the target rebuild rate. The disclosed technology also determines that host I/O processing is being performed on the processor cores from processor core MAX_N downwards through processor core number 4. The value of N_min is 3, the value of J is MAX_N minus 3, N_min+J is not greater than MAX_N, and accordingly at step 506 of FIG. 5 N is set to N_min (e.g. 3), and M is set to M_min (e.g. 2). As a result, the rebuild operation is performed for a predetermined period of time using three processor cores (e.g. processor cores 1-3 as shown by Rebuild Jobs 900) to execute rebuild jobs, and the maximum number of physical blocks for which data is rebuilt in parallel by each rebuild job during the predetermined time period may be equal to M_min (e.g. 2). Host I/O processing is performed during the redetermined time period on the remaining processor cores, i.e. the processor cores from processor core MAX_N down through processor core 4, as shown by Host I/O Processing 902.

FIG. 10 is a flow chart showing steps performed in some embodiments to perform a data storage drive rebuild operation.

At 1000, the disclosed technology detects the failure of a data storage drive.

At 1002, the disclosed technology calculates a target rebuild rate that enables the data previously stored on the failed data storage drive to be completely rebuilt on at least one other data storage drive within an expected drive rebuild time window.

At 1004, the disclosed technology calculates a new value for at least one drive rebuild parameter based on a value for the drive rebuild parameter corresponding to the target rebuild rate indicated by a static rebuild rate data structure and a current level of host I/O (Input/Output) activity.

At 1006, the disclosed technology rebuilds the data previously stored on the failed data storage drive on the other data storage drive for a predetermined time period with the at least one drive rebuild parameter set to the new value for the drive rebuild parameter.

Steps 1002, 1004, and 1006 may be repeated as necessary until all the data previously stored on the failed data storage drive is completely rebuilt.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
in response to detecting failure of a data storage drive, performing a drive rebuild operation by periodically:
calculating a target rebuild rate that enables data previously stored on the failed data storage drive to be completely rebuilt on at least one other data storage drive within an expected drive rebuild time window;
calculating a new value for at least one drive rebuild parameter based on a value for the at least one drive rebuild parameter corresponding to the target rebuild rate indicated by a static rebuild rate data structure and a current level of host I/O (Input/Output) activity; and
rebuilding the data previously stored on the failed data storage drive on a replacement data storage drive for a predetermined time period with the at least one drive rebuild parameter set to the new value for the drive rebuild parameter.

2. The method of claim 1, wherein rebuilding the data previously stored on the failed data storage drive on the replacement data storage drive during the predetermined time period includes executing a plurality of rebuild jobs in parallel during the predetermined time period; and
wherein the at least one drive rebuild parameter includes a total number of processor cores on which corresponding individual drive rebuild jobs are scheduled for execution in parallel.

3. The method of claim 2, further comprising:
determining the current level of host I/O activity at least in part by detecting a number of processor cores that are not currently performing host I/O processing; and
wherein calculating the new value for the total number of processor cores on which corresponding individual drive rebuild jobs are scheduled for execution in parallel during the predetermined time period includes:
comparing the number of processor cores not currently performing host I/O processing to the value for the total number of processor cores on which corresponding individual drive rebuild jobs are scheduled for execution in parallel indicated by the static rebuild rate data structure, and in response to the number of processor cores not currently performing host I/O processing exceeding the total number of processor cores on which corresponding individual drive rebuild jobs are scheduled for execution in parallel indicated by the static rebuild rate data structure, setting the total number of processor cores on which corresponding individual drive rebuild jobs are scheduled for execution in parallel to the number of processor cores not currently performing host I/O processing.

4. The method of claim 3, further comprising executing each of the individual drive rebuild jobs on the corresponding processor cores at a higher execution priority than the host I/O processing.

5. The method of claim 3, further comprising:

assigning drive rebuild jobs to corresponding processor cores within a set of processor cores according to a first ordering of the processor cores within the set of processor cores; and assigning host I/O processing to processor cores within the set of processor cores according to a second ordering of the processor cores within the set of processor cores, wherein the second ordering of the processor cores within the set of processor cores comprises a reverse order with respect to the first ordering of the processor cores within the set of processor cores.

6. The method of claim 2, wherein rebuilding the data previously stored on the failed data storage drive further includes rebuilding data previously stored in multiple physical blocks in parallel; and wherein the at least one drive rebuild parameter further includes a total number of physical blocks for which data is rebuilt in parallel by each one of the rebuild jobs during the predetermined time period.

7. The method of claim 2, wherein the data previously stored on the failed data storage drive was protected using mapped RAID (Redundant Array of Independent Disks) data protection provided in a plurality of RAID extents; and wherein each one of the drive rebuild jobs rebuilds data previously stored in a single one of the RAID extents.

8. The method of claim 1, wherein the static rebuild rate data structure comprises a table of data elements storing a plurality of rebuild rates, and further comprising:

determining a data element in the table that stores a value equal to the target rebuild rate; and determining the value for the at least one drive rebuild parameter corresponding to the target rebuild rate indicated by the static rebuild rate data structure as an index of the data element in the table that stores the value equal to the target rebuild rate.

9. The method of claim 1, wherein the calculating of the target rebuild rate that enables the data previously stored on the failed data storage drive to be completely rebuilt on the replacement data storage drive within the expected rebuild time window is based at least in part on a percentage of the data previously stored on the failed data storage drive that has been rebuilt on the at least one other data storage drive and an amount of time that has elapsed since the drive rebuild operation began.

10. A data storage system comprising:

at least one storage processor including processing circuitry and a memory;

a plurality of non-volatile data storage drives communicably coupled to the storage processor; and wherein the memory has program code stored thereon, wherein the program code, when executed by the processing circuitry, causes the processing circuitry to:
perform a drive rebuild operation by causing the processing circuitry to periodically:

calculate a target rebuild rate that enables data previously stored on the failed data storage drive to be completely rebuilt on at least one other data storage drive within an expected drive rebuild time window;

calculate a new value for at least one drive rebuild parameter based on a value for the at least one drive rebuild parameter corresponding to the target rebuild rate indicated by a static rebuild rate data structure and a current level of host I/O (Input/Output) activity; and rebuild the data previously stored on the failed data storage drive on a replacement data storage drive for a predetermined time period with the at least one drive rebuild parameter set to the new value for the drive rebuild parameter.

11. The data storage system of claim 10, wherein the program code, when executed, further causes the processing circuitry to rebuild the data previously stored on the failed data storage drive on the replacement data storage drive during the predetermined time period at least in part by executing a plurality of rebuild jobs in parallel during the predetermined time period; and wherein the at least one drive rebuild parameter includes a total number of processor cores on which corresponding individual drive rebuild jobs are scheduled for execution in parallel.

12. The data storage system of claim 11, wherein the program code, when executed, further causes the processing circuitry to:

determine the current level of host I/O activity at least in part by detecting a number of processor cores that are not currently performing host I/O processing; and wherein the program code, when executed, causes the new value for the total number of processor cores on which corresponding individual drive rebuild jobs are scheduled for execution in parallel during the predetermined time period to be calculated at least in part by causing the processing circuitry to:

compare the number of processor cores not currently performing host I/O processing to the value for the total number of processor cores on which corresponding individual drive rebuild jobs are scheduled for execution in parallel indicated by the static rebuild rate data structure, and in response to the number of processor cores not currently performing host I/O processing exceeding the total number of processor cores on which corresponding individual drive rebuild jobs are scheduled for execution in parallel indicated by the static rebuild rate data structure, set the total number of processor cores on which corresponding individual drive rebuild jobs are scheduled for execution in parallel to the number of processor cores not currently performing host I/O processing.

13. The data storage system of claim 12, wherein the program code, when executed, further causes the processing circuitry to execute each of the individual drive rebuild jobs on the corresponding processor cores at a higher execution priority than the host I/O processing.

14. The data storage system of claim 12, wherein the program code, when executed, further causes the processing circuitry to:

assign drive rebuild jobs to corresponding processor cores within a set of processor cores according to a first ordering of the processor cores within the set of processor cores; and assign host I/O processing to processor cores within the set of processor cores according to a second ordering of the processor cores within the set of processor cores, wherein the second ordering of the processor cores within the set of processor cores comprises a reverse order with respect to the first ordering of the processor cores within the set of processor cores.

15. The data storage system of claim 11, wherein the program code, when executed, causes the processing circuitry to rebuild the data previously stored on the failed data storage drive at least in part by causing the processing circuitry to rebuild data previously stored in multiple physical blocks in parallel; and wherein the at least one drive rebuild parameter further includes a total number of physical blocks for which data is rebuilt in parallel by each one of the rebuild jobs during the predetermined time period.

16. The data storage system of claim 11, wherein the data previously stored on the failed data storage drive was protected using mapped RAID (Redundant Array of Independent Disks) data protection provided in a plurality of RAID extents; and wherein each one of the drive rebuild jobs rebuilds data previously stored in a single one of the RAID extents.

17. The data storage system of claim 10, wherein the static rebuild rate data structure comprises a table of data elements storing a plurality of rebuild rates, and wherein the program code, when executed, further causes the processing circuitry to:

determine a data element in the table that stores a value equal to the target rebuild rate; and determine the value for the at least one drive rebuild parameter corresponding to the target rebuild rate indicated by the static rebuild rate data structure as an index of the data element in the table that stores the value equal to the target rebuild rate.

18. The data storage system of claim 10, wherein the calculation of the target rebuild rate that enables the data previously stored on the failed data storage drive to be completely rebuilt on the replacement data storage drive within the expected rebuild time window is based at least in part on a percentage of the data previously stored on the failed data storage drive that has been rebuilt on the at least one other data storage drive and an amount of time that has elapsed since the drive rebuild operation began.

19. A computer program product including a non-transitory computer readable medium having instructions stored thereon, wherein the instructions, when executed on processing circuitry, cause the processing circuitry to perform steps including:

calculating a target rebuild rate that enables data previously stored on the failed data storage drive to be completely rebuilt on at least one other data storage drive within an expected drive rebuild time window;

calculating a new value for at least one drive rebuild parameter based on a value for the at least one drive rebuild parameter corresponding to the target rebuild rate indicated by a static rebuild rate data structure and a current level of host I/O (Input/Output) activity; and rebuilding the data previously stored on the failed data storage drive on a replacement data storage drive for a predetermined time period with the at least one drive rebuild parameter set to the new value for the drive rebuild parameter.

* * * * *